3,369,844
SPOKED WHEEL AND RESILIENT
TIRE THEREFOR
Earl F. Hamilton, Boca Raton, Fla., and Edwin K. Moore,
Columbus, Ind., assignors to Hamilton Cosco, Inc.,
Columbus, Ind., a corporation of Indiana
Filed Feb. 2, 1966, Ser. No. 524,552
2 Claims. (Cl. 301—84)

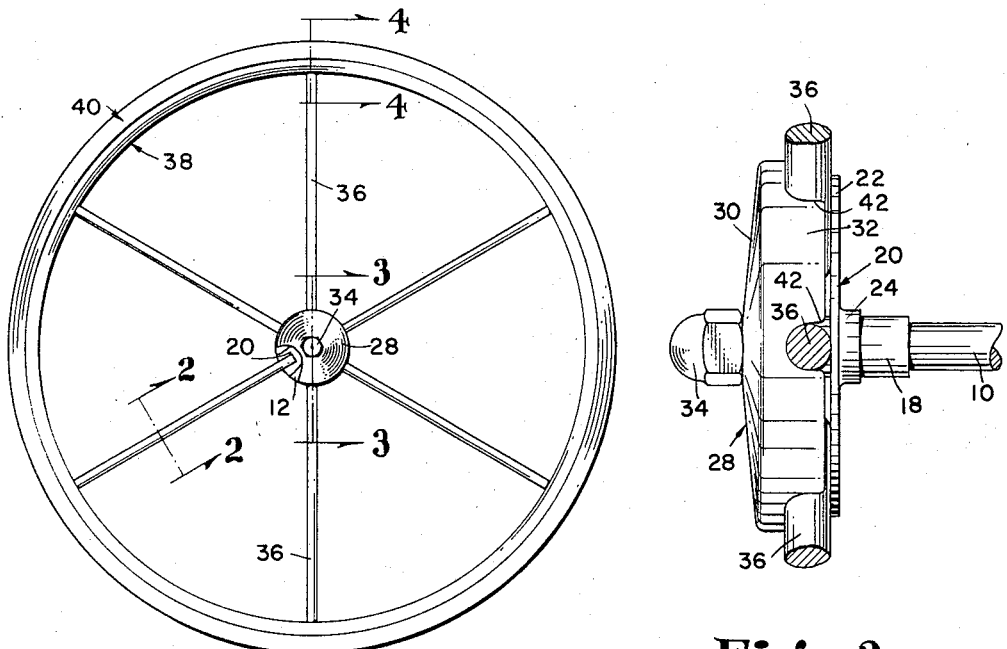
Fig. 1
Fig. 2
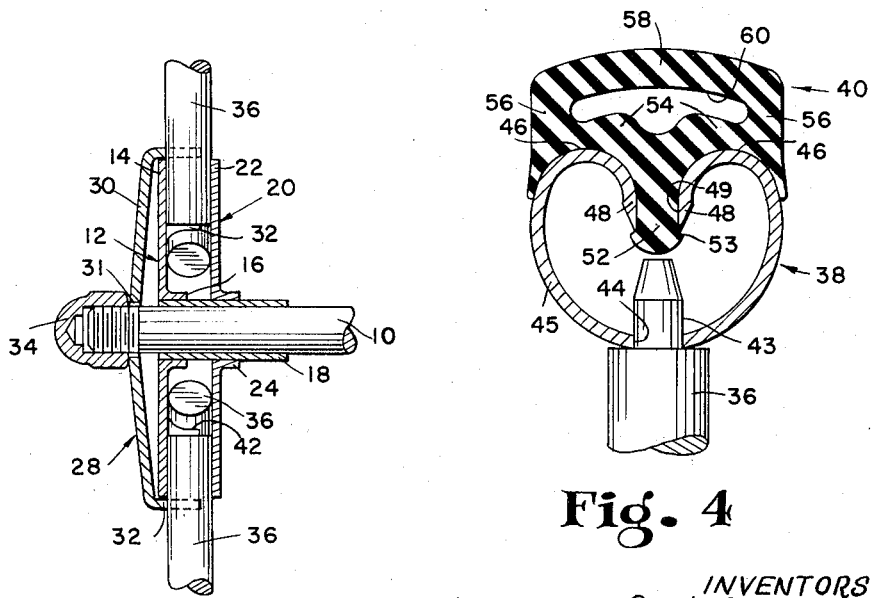
Fig. 3
Fig. 4
INVENTORS
Earl F. Hamilton
Edwin K. Moore
BY
Attorneys

ABSTRACT OF THE DISCLOSURE

A wheel having a hub assembly formed from a pair of axially spaced annular flanges mountable on an axle and between which the inner ends of a plurality of spokes are received. A cover is also mountable on said axle and extends over one of said flanges with its outer end received between the spokes. A rim is connected to the outer ends of the spokes and a tire is bindingly mounted thereon.

---

This invention relates to a wheel, and has for its objects the provision of a wheel which can be quickly and easily assembled, which can be quickly and easily mounted on an axle, which will be freely rotatable on said axle, and which will have an attractive appearance yet prove sturdy and durable in use.

In accordance with the preferred form of the invention, there is provided a hub assembly comprising inner and outer hubs mounted on a bearing adopted to be rotatably received on an axle. A cover is mounted on the outer end of the hub assembly and is retained thereon by a cap adapted to be connected to the terminal end of said axle. A plurality of spokes radiate outwardly from the hub assembly and are connected at their outer ends to a rim concentric with said hub assembly. An annular slot extends around the outer circumference of the rim and lockingly receives an inwardly projecting rib on a tire for mounting said tire on the rim. Desirably, said tire has portions extending axially outwardly from its rib abutting the outer circumference of the rim adjacent the slot therein to provide extended axial support for the tire on the rim.

Other objects and features of the invention will become apparent from the more detailed description which follows and from the accompanying drawings, in which:

FIG. 1 is a side elevation of a wheel embodying the invention;

FIG. 2 is an enlarged vertical section taken on the line 2—2 of FIG. 1;

FIG. 3 is an enlarged vertical section taken on the line 3—3 of FIG. 1; and

FIG. 4 is an enlarged vertical section taken on the line 4—4 of FIG. 1.

As shown, our wheel is adapted to be rotatably mounted on an axle 10 by a hub assembly best illustrated in FIG. 3. Said hub assembly comprises an outer hub 12 having an annular flange 14 connected at its inner circumference to an axially projecting sleeve 16 fixedly mounted on a sleeve bearing 18 adapted to be rotatably carried on the axle 10. An inner hub 20 having an annular flange 22 connected at its inner circumference to a sleeve 24 is fixedly mounted on the bearing 18 axially inwardly from the hub 12 to dispose the hub flanges 14 and 22 in axially spaced parallel relationship.

A cover 28 is received over the hub 12. Said cover comprises a web 30 having a centrally disposed opening 31 through which the axle 10 projects. The outer edge of the web 30 terminates in an annular skirt 32 extending axially inwardly from the web 30 over the outer circumference of the hub 12. The hub assembly is retained on the outer end of the axle 10 by a cap 34 threadably received on said axle and adapted to be drawn up against the cover 28. The wheel can be prevented from sliding inwardly on the axle by any convenient type of spacer or abutment on the axle (not shown) abutting the inner end of the bearing 18.

A plurality of spokes 36 radiate outwardly from the hub assembly to support a rim 38 and tire 40. As shown in FIG. 3, the inner ends of the spokes 36 are received between the hub flanges 14 and 22 and are fixedly connected thereto such as by welding, or the like. A plurality of slots 42 are formed in the cover skirt 32 to embrace the spokes 36, and thus act in combination with the cap 34 to prevent the cover from rotating with respect to ether components of the wheel.

As shown in FIG. 4, the outer ends of the spokes 36 are shouldered, as at 43, and are received in openings 44 formed in the inner circumferential wall 45 of the rim with the spoke shoulders 43 abutting said wall. The rim wall 45 is integral with a pair of axially spaced arcuate bearing surfaces 46 defining the outer circumference of the rim. The adjacent edges of the bearing surfaces 46 are bent radially inwardly to provide a pair of inwardly projecting fingers 48 with the space between the fingers defining an annular slot 49 in the outwardly presented rim face.

The tire 40, which is conveniently formed from any desired resilient material, has an inwardly projecting rib 52 which is received in the slot 49. As shown in FIG. 4, the inner end of the rib 52 has an expanded head having a wider cross-section than the slot 49. Thus, when the rib 52 is forced into the slot 49, the fingers 48 engage the rib head 53 for lockingly mounting the wheel on the rim. The outer end of the rib 52 is integral with a pair of axially projecting arcuate stretches 54 which embrace and wrap around the rim surfaces 46 to thus provide an extended axial support between the rim and tire. The outer ends of the stretches 54 terminate in radially projecting stretches 56 joined by an axially extending tread 58. The stretches 56 dispose the tread 58 and stretches 54 in radially spaced relationship to thus provide an internal annular chamber 60 within the tire and extending therearound. Said chamber cushions the tread 58 from the inner portions of the wheel and the rim 38 to increase the effective resiliency of the wheel.

We claim:
1. A wheel, comprising inner and outer hubs each including an annular flange and an axially extending sleeve, a bearing mounted in the hub sleeves and rotatably mountable on an axle, a plurality of spokes having their inner ends received between and rigidly connected to the flanges on said hubs and their outer ends connected to a tire-supporting rim, a cover having a web provided with an opening for the reception of said axle, said web having an annular skirt projecting axially inwardly around the flange on said outer hub, and having a plurality of slots formed therein received around said spokes, and means mountable on said axle in engagement with the web of said cover for releasably retaining the wheel on said axle.

2. A wheel, comprising a hub assembly adapted to be rotatably mounted on an axle, a rim having an inner circumferential wall operatively connected to said hub assembly, said inner circumferential wall being connected to a pair of axially spaced arcuate bearing surfaces terminating in a pair of radially inwardly directed fingers defining an annular slot in the outer circumference of said rim, a tire having an inwardly projecting rib secured in said slot, said rib having a head at its inner end having a wider cross-section than said slot, and a pair of arcuate stretches on said tire projecting axially from the opposite sides of said rib in bearing engagement with the arcuate bearing surfaces on said rim, said arcuate stretches terminating at their outer ends in a pair of axially spaced radially extending stretches joined at their outer ends by a tread in radially spaced relation to said rib and said pair of stretches whereby said tire is provided with an internal annular chamber.

References Cited

UNITED STATES PATENTS

| | | | |
|---|---|---|---|
| 673,844 | 5/1901 | Pinover | 301—84 |
| 1,057,398 | 4/1913 | Allison | 152—379 |
| 1,139,984 | 5/1915 | Murray | 301—84 |
| 1,504,090 | 8/1924 | Brodie | 301—84 |
| 2,692,801 | 10/1954 | Rosenberg | 152—379 |

FOREIGN PATENTS 723,745  2/1955  Great Britain.

RICHARD J. JOHNSON, *Primary Examiner.*

BENJAMIN HERSH, *Examiner.*